June 8, 1965  W. S. EASTMAN ETAL  3,188,270
APPARATUS FOR CONSOLIDATING AND CALENDERING
MOLDED PULP ARTICLES
Filed April 29, 1963  4 Sheets-Sheet 1

Watson S. Eastman
Eugene M. Alsman
INVENTORS

BY

Atty.

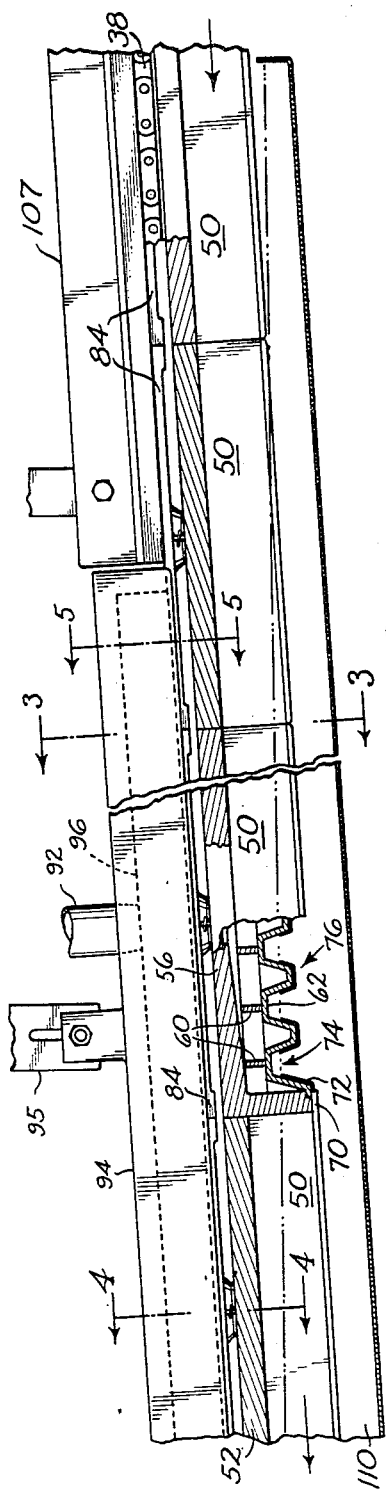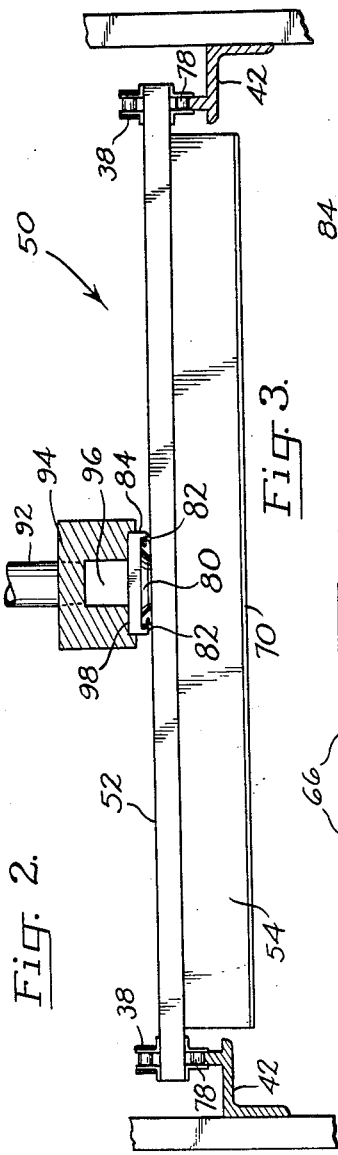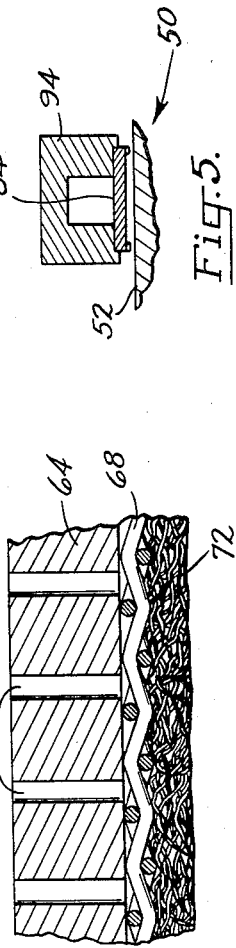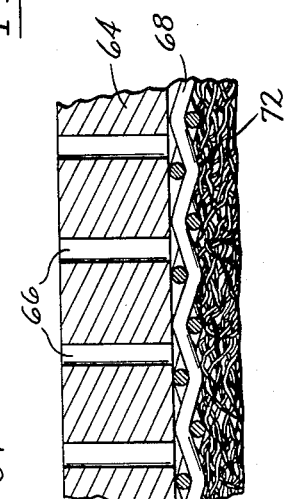
Watson S. Eastman
Eugene M. Alsman
INVENTORS Watson S. Eastman
Eugene M. Alsman
INVENTORS

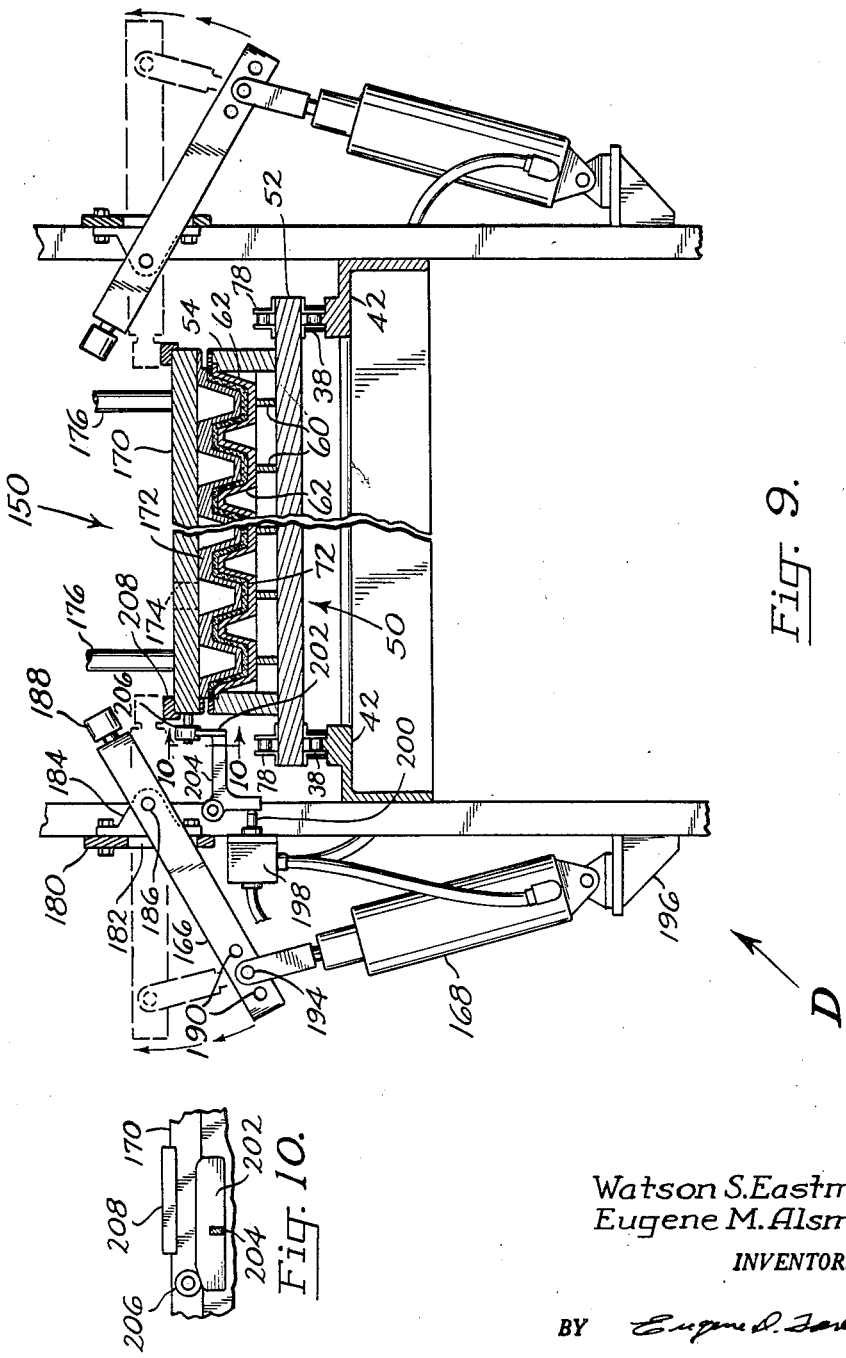

United States Patent Office 3,188,270
Patented June 8, 1965

3,188,270
APPARATUS FOR CONSOLIDATING AND CALENDERING MOLDED PULP ARTICLES
Watson S. Eastman and Eugene M. Alsman, Portland, Oreg., assignors to Molded Container Corporation, a corporation of Oregon
Filed Apr. 29, 1963, Ser. No. 276,619
5 Claims. (Cl. 162—395)

This invention relates to the manufacture of molded pulp articles such as egg cartons, fruit trays, cartons, containers, small figures and like objects. It pertains particularly to apparatus for the manufacture of such objects which, in addition to molding the articles from the pulp, presses the molded articles and calenders their surfaces to impart desired density and surface qualities to them.

Heretofore two principal types of apparatus have been employed in the vacuum forming of molded pulp articles. In the first, a plurality of vacuum forming dies are mounted on a cylinder-type conveyor which, upon rotation, dips the dies into a selected pulp. In the second, a plurality of vacuum forming dies are mounted on a horizontally arranged endless conveyor. On the upper stretch of the conveyor the dies are filled with pulp which then is sucked against the dies to produce the molded articles. In either case, the molded articles are stripped from the dies and transferred to drying units to dehydrate them and form a finished product.

Both of the foregoing classes of apparatus inherently encounter operational difficulties which have interfered with their successful application. Valving difficulties have prevented the successful transfer of the pulp to the dies. The freshly molded wet articles are extremely fragile and difficult to remove from the dies without breakage. The wet, freshly molded articles are difficult to dry in the short drying cycle demanded of a continuous commercial operation. The dies tend to become plugged, particularly since the pulp slurries employed are made from waste paper and magazine stock which are loaded with fillers, adhesives, and pigments.

It is a particular problem in the manufacture of molded pulp articles to provide apparatus which, after formation of the articles on the die, will consolidate the articles and calender their freshly formed surfaces. This operational step is desirable since it densifies the articles and makes them stronger, since it reduces their volume for packaging, and since it gives them a smooth surface of modified porosity. In the high speed continuous production of molded pulp articles, it obviously is difficult to accomplish these objectives in view of the problems involved in applying high pressure accurately and uniformly over a rapidly moving, broad die surface.

It is the general object of the present invention to provide pulp molding apparatus which overcomes the foregoing difficulties and which is applicable to the rapid, continuous commercial production of various molded pulp articles of predetermined and uniform properties.

It is a particular object of this invention to provide pulp molding apparatus which includes means for pressing and calendering freshly molded pulp articles while continuously moving on the forming dies, thereby densifying the articles and imparting desirable surface qualities to them.

The manner in which the foregoing and other objects of this invention are accomplished will be apparent from the accompanying specification and claims considered together with the drawings, wherein:

FIG. 2 is an enlarged fragmentary view, partly in section, illustrating the die assemblies employed in the herein described pulp molding apparatus, their manner of mounting, and the manner in which they are passed through a pulp slurry;

Figure 1:
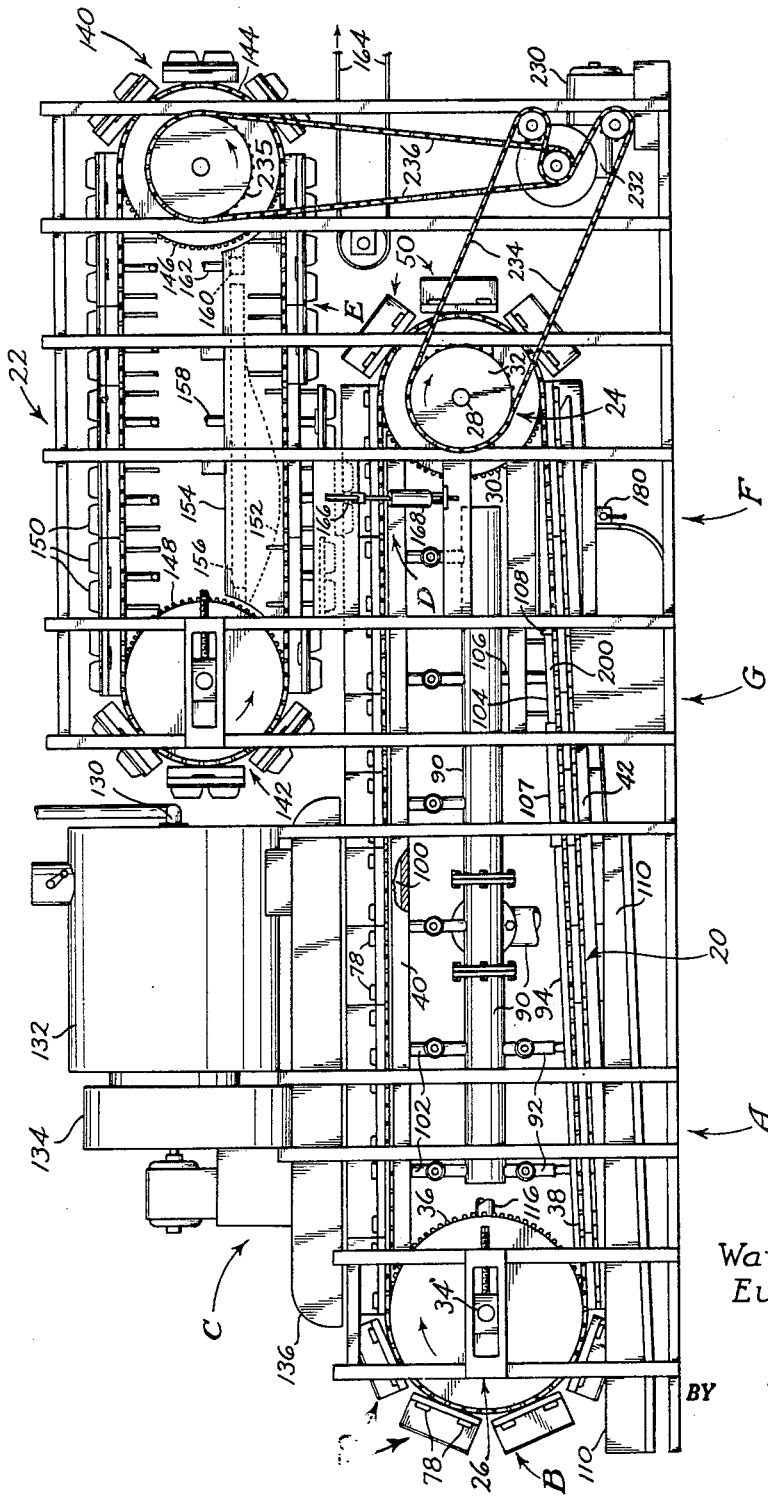
FIG. 1 is a view in side elevation of the herein described pulp molding apparatus.
Figure 8:
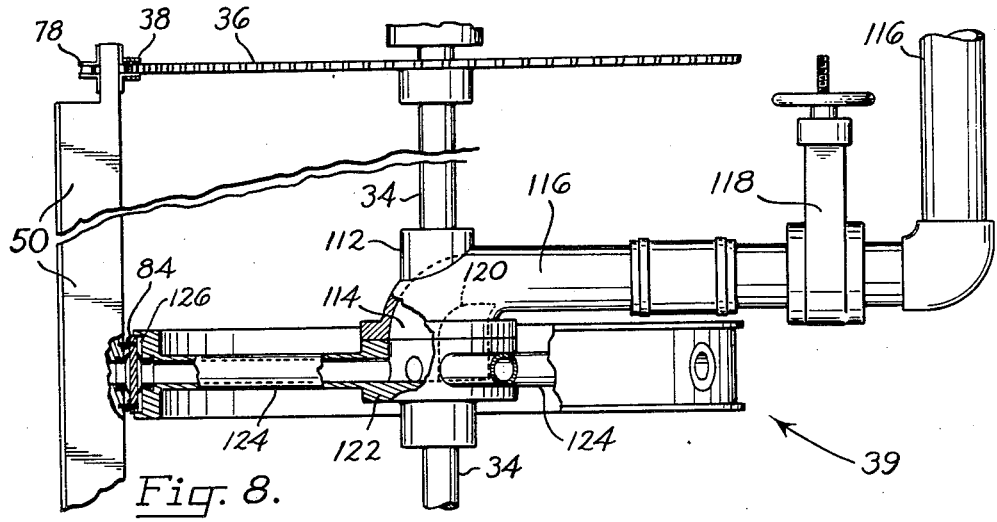
Figure 7:
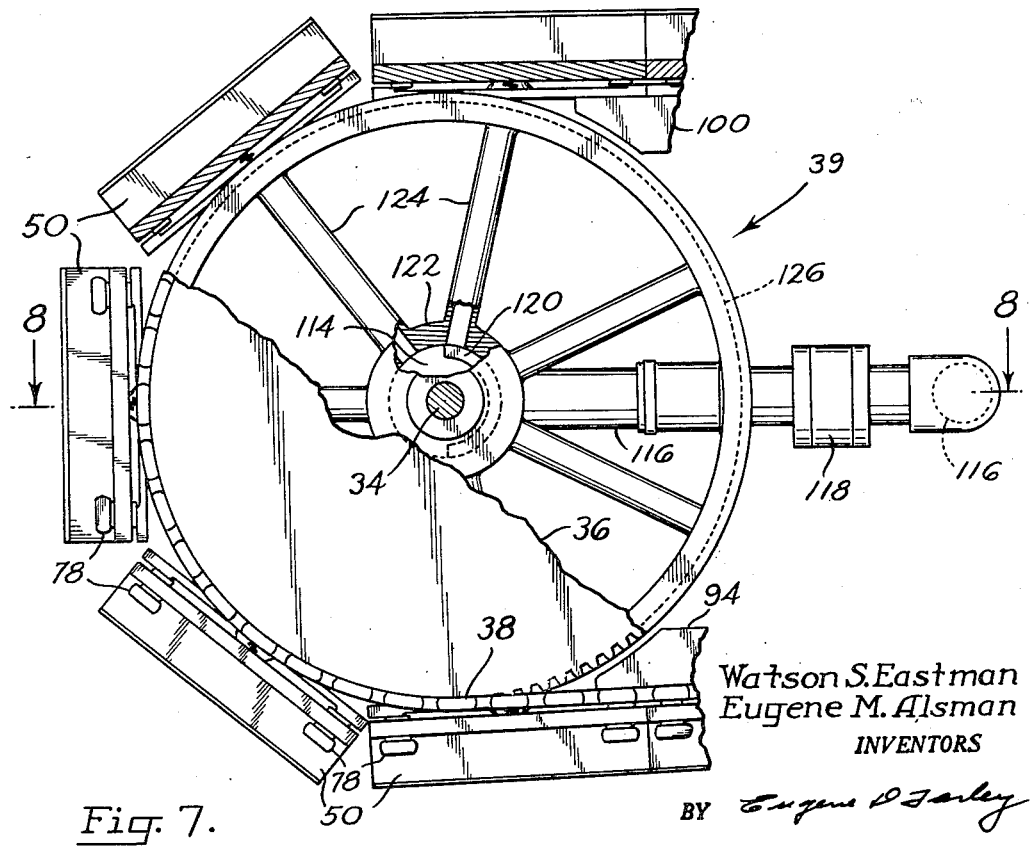

FIGS. 3, 4 and 5 are transverse sectional views taken along lines 3—3, 4—4 and 5—5, respectively, of FIG. 2;

FIG. 6 is an enlarged, fragmentary, detail view illustrating still further the construction of the die and the manner of building up a pulp article on it;

FIG. 7 is a view in side elevation, partly in section, and partly broken away, of a vacuum roll assembly included in the herein described pulp molding apparatus;

FIG. 8 is a plan view, partly in section, of the vacuum roll of FIG. 7;

FIG. 9 is a transverse, detail, sectional view of the overlapped portions of the two conveyors of FIG. 1, illustrating the manner of construction and mode of application of the herein described pressing and calendering unit; and FIG. 10 is a detail, longitudinal view in section taken along line 10—10 of FIG. 9.

The presently described apparatus for pressing pulp articles is adapted for use in conjunction with vacuum pulp molding apparatus in which a vacuum pulp molding die is dipped into a pulp slurry. The die is moved through the slurry in substantially straight line motion, thereby building up on the die a pulp article of predetermined thickness. The die then is removed from the slurry, after which vacuum is applied to the article on the die for partly consolidating and dehydrating it.

Next, hot gas is passed through the article still on the die for further drying it and rendering it self-sustaining. Thereafter, in the presently described unit, the article is pressed against the die for compressing it and calendering its surface. The article then is removed from the die and further dried if necessary to attain the desired moisture content.

In effectuating this sequence of operations, a pair of partially overlapped, aligned, endless conveyors are employed. The first conveyor mounts vacuum forming dies which, as they traverse the lower stretch of the conveyor in inverted position, are dipped into a pulp slurry forming the wet pulp article on the dies. Suction is applied to the articles partly dehydrating them, after which hot gas may be sucked through them to dry them to the desired degree. The dies then on the upper stretch of the first lower conveyor in upright position pass beneath the overlapping second conveyor.

The latter conveyor mounts vacuum transfer dies which mate with the forming dies. By releasing vacuum on the latter and applying vacuum to the former, the molded pulp articles are transferred to the transfer dies from which they at a later point in their travel are stripped and transferred to an offbearing conveyor.

In accordance with the present invention, in this transfer sequence the transfer dies are employed to serve the important function of pressing the articles against the forming dies before transfer of the articles. The forming dies thus in effect serve as press beds against which the pulp articles are pressed, consolidating them and calendering their outer surfaces.

The apparatus used for pressing the transfer dies against the forming dies comprise cam actuated lever means, appropriately positioned to press with great force against the transfer dies at the proper moment, to achieve the desired consolidation and calendering of the molded pulp articles just prior to their removal from the forming dies.

Considering the foregoing in greater detail and with particular reference to the drawings:

In carrying out the invention vacuum forming dies are passed successively through a plurality of zones in which the various operations described above are carried out. As is apparent from FIG. 1, this is made possible through the employment of a pair of aligned partially overlapped endless conveyors, indicated generally at 20, 22.

On lower conveyor 20 the vacuum forming dies first pass through an article-forming zone A in which the dies, in inverted position, are dipped into a pulp slurry for forming the article on the die surfaces.

Next the dies, bearing the partly formed wet articles, are passed through a dehydrating and consolidating zone B where part of the water is removed from the articles by suction.

In the next zone, the drying zone C, hot gases are passed through the articles on the dies for drying the articles so that they may be handled safely, or for drying them completely if this is desired.

Next, in the pressing zone D, the dried articles are pressed against the dies in which they are contained for consolidating the articles and calendering their surfaces. This is accomplished by the application of pressing and transfer dies mounted on the overlapping endless conveyor 22.

In the transfer zone E which follows, the pressed articles are removed from the forming dies and transferred, for example, to an offbearing conveyor.

Preliminary to being passed again through the article forming zone, the forming dies are passed through two cleaning stages. In the first, zone F, they are spot cleaned with steam, detergents, chemicals or other materials for the removal particularly of gummy deposits. In the second stage, carried out in zone G, the dies are subjected to a general washing designed to remove dirt and residual pulp.

The lower endless conveyor system 20, which carries the vacuum forming dies employed in the foregoing sequence, is supported between a drive roll assembly 24 and a vacuum roll assembly 26.

The drive roll assembly is mounted on a rotatable shaft 28 to which are affixed a pair of sprockets 30, an intermediate guide wheel not illustrated, and a drive sprocket 32.

The vacuum roll assembly is supported on a rotatable shaft 34 to which are affixed a pair of sprockets 36 and an intermediate vacuum wheel 39, to be described in detail later.

Sprockets 30, 36 mount a pair of drive chains 38 which by reason of their horizontal position provide upper and lower stretches between the two roller assemblies. The upper stretches of the chains are supported by horizontal tracks 40; the lower, by horizontal tracks 42.

The conveyor thus described supports a series of vacuum die assemblies arranged end to end in abutting relationship. The construction of these assemblies, and their manner of mounting on the conveyor, is evident particularly in FIGS. 2 and 3.

Each assembly is indicated generally at 50. It includes a die holder having a base 52, side walls 54 and a tapered bottom 56. The base is provided with a central vacuum aperture 58 and with a plurality of ribs 60.

The ribs support a die member 62 of appropriate construction and contour. Thus it may be fabricated from sintered metal, sintered glass, sintered plastic, or from perforated metal sheets overlaid with a screen.

In the special case illustrated in FIG. 6, the die member comprises a base 64 provided with numerous vacuum openings 66 and overlaid with a screen 68. The screen and base are maintained in position against the edges of walls 54 of the die holder by means of a retainer 70. When the die is immersed in a pulp slurry, and suction applied through opening 66, an article 72 of pulp builds up on the screen 68, in the contour of the die.

Although the die contour is widely variable, in the illustrated form of the invention, it assumes the shape of an egg carton having depressed areas 74 to receive the eggs and peaked areas 76 which act as dividers to separate the eggs.

To support the die holders as they travel, first on the lower stretch, and then on the upper stretch of the endless conveyor, there are provided a plurality of rollers 78 on the margins of the base plate 52, on the side opposite chains 38.

Coupling means are associated with each die assembly to make possible coupling the die to a source of vacuum, in sealed relation, over a substantial duration of linear travel.

Thus in vacuum aperture 58 of the base of the die holder (FIG. 4), there is seated a resilient sealing ring. A pair of connecting pins 82, diametrically opposed, are pressed into the die holder bottom outside the sealing ring 80. A slide bar 84 having a vacuum aperture 86 receives the free ends of pins 82.

Resiliently compressive members such as springs 88, or lengths of rubber tubing, are mounted on pins 82, between die holder base 56 and slide plate 84.

Vacuum aperture 86 in the slide plate and vacuum aperture 58 in the die holder are in substantial registration and afford means of connecting the die holder to the source of vacuum.

The vacuum source is a vacuum pump of substantial capacity provided with a water trap. The pump communicates with a vacuum conduit system including main line 90 and branch lines 92, each of which is controlled by its own valve.

Branch lines 92 in turn communicate with a vacuum bar or vacuum trough 94 adjustably supported from slotted hanger bars 95. Vacuum trough 94 is formed with a central, downwardly facing channel 96 and with a guideway 98 which borders the channel. This guideway is dimensioned to receive slide bar 84 of the die assembly in sliding, sealed relationship.

Similar vacuum bars are associated with other units of the conveyor assembly. Thus an elongated vacuum bar 100 is associated with the upper stretch of the conveyor. It is connected to vacuum conduit 90 by means of valved branch lines 102. It works in the drying and pressing zones of the assembly, as will appear hereinafter.

A third vacuum bar 104 is connected through feeder line 106 to vacuum conduit 90. It works in the washing zone G of the unit as also will appear hereinafter.

To bridge the gaps between the vacuum bars there are supplied rail segments 107 and 108 respectively which are traversed by slide plates 84 on the die holders during the intervals when the slide plates are not in the process of traversing one of the vacuum bars.

In this manner there is afforded a means for continuously applying vacuum to the dies as they progress linearly through the various zones. In article-forming zone A, vacuum is supplied through vacuum trough 94. In drying zone C, as well as in pressing zone E, it is supplied by vacuum trough 100. In washing zone G it is supplied by vacuum trough 104.

In article forming zone A, the dies are passed in end abutting relationship through a vat 110 having a sloping bottom and arranged to extend beyond the end of vacuum roll 26. As the dies in their inverted position enter the upstream end of the vat and progress along the length of it, they are immersed progressively deeper in the slurry contained in the vat, suction being applied all the while. The pulp articles thereupon are built up on the dies to a depth determined by such factors as the consistency of the slurry, the intensity of the vacuum, the size of the openings in the dies, etc.

It is a particular feature of the invention, however, that exposing the inverted dies to the slurry over a relatively prolonged period of linear travel enables better control of the vacuum and of the deposition of the pulp on the dies, resulting in the formation of pulp articles of unform wall thickness, which are softer and more resilient and have more uniform wall thicknesses than do the articles manufactured by prior art machines relying upon cylinder and die filling principles.

After leaving vat 110, the dies pass to zone B, the dehydrating and consolidating zone. Here three important operations are performed.

First, the forming of the articles against the die surface is completed. Second, the articles are dehydrated by the vacuum removal of a substantial proportion of water facilitating the subsequent drying operation and improving the strength of the articles. Third, the articles are held firmly against the die as they are transferred to the upper stretch of the conveyor, preventing injury to them.

These three functions are made possible by the inclusion in the assembly of a novel vacuum wheel 39, the construction of which is illustrated in FIGS. 7 and 8.

As mentioned before, this wheel is a component of vacuum roll assembly 26 which supports one end of the lower endless conveyor system. It is fixed to shaft 34 betwen sprockets 36. It includes a conduit 112, the interior of which is provided with a passageway 114 communicating with a vacuum line 116 through valve 118. The construction of the conduit is such that a semi-circular extension 120 projects into the hollow hub 122 of the vacuum wheel.

Hub 122 communicates with a plurality of hollow spokes 124. These are spaced by angular distances corresponding to the distances between the vacuum apertures and the die assemblies.

The hollow spokes open out into a peripheral channel 126 along the rim of the wheel. This channel corresponds in function and lateral dimension to guideway 98 in vacuum trough 94. It is designed to receive slide bar 84 with the die aperture registering with the opening through the spoke.

Accordingly, as the die assembly is passed around wheel 39, vacuum is applied continuously to each die, sucking water from the molded pulp article on the die face, and dehydrating it while contemporaneously completing its formation and holding it securely in place. The die assemblies then are passed to zone C in which the articles are dried.

In zone C the drying is effectuated by passing hot gas through the articles and through the dies, still making use of the evacuating system. To this end the assemblies are passed along vacuum trough 100, with slide plates 84 sliding in the groove of the trough, in the manner described in conjunction with vacuum trough 94.

A burner 130 heats a furnace 132, the resulting hot gases being passed by fan 134 into a hood-shaped oven 136 which is open at the bottom, with its side walls extending in close proximity to the side edges of the die holders. The die assemblies, which now have been rotated 180° from their inverted position in zone A, lie face up and accordingly the hot gases contained in the oven are sucked by the applied vacuum through the articles, through the dies and out through vacuum conduit 90.

By controlling the vacuum applied, the temperature of the gases, and the rate of travel through the heating zone, a very precise degree of drying of the pulp articles may be achieved. This may range, for example, from a rather cursory drying intended only to render the articles self-sustaining, to a drying so complete as to eliminate the necessity for a subsequent drying stage. The latter might be desirable in circumstances where a large article, not readily susceptible to rapid transfer and ordinary drying, is being manufactured.

The dried articles then are ready for the next stage of the operation which comprises pressing them and calendering their exposed surfaces in zone D. This procedure, in turn, is preliminary to removal of the articles from the dies and their transfer to an offbearing conveyor in zone E.

Both of these functions are carried out through the agency of endless conveyor unit 22 which as mentioned above, overlaps and is aligned with endless conveyor 20.

The construction of endless conveyor 22 is known and hence it is not illustrated in great detail. However, it comprises a drive roll assembly 140 and an idler roll assembly 142 mounting an endless conveyor which includes chains 144 engaging sprockets 146, 148 on the respective rolls.

Mounted on the rolls are a plurality of male transfer dies 150. These are complementary in contour to the female forming dies on the lower endless conveyor. They comprise a plate 170 to which are fastened the die members 172. Vacuum is applied to the dies through ports 174. The entire assembly is supported in known manner by rods 176, which are connected to endless conveyor system 22.

As they traverse the lower stretch of conveyor 22, transfer dies 150 communicate with a vacuum trough 154 which is similar in design and function to vacuum troughs 94, 100 previously described. However, the length of the trough is discontinuous.

The length indicated at 156 is connected to a source of vacuum trough conduit 158. On the other hand, the length indicated at 160 is connected through conduit 162 to a supply of air under pressure. In this manner the formed articles may be sucked up on the transfer dies in a first stage and, after a predetermined duration of linear travel, blown off the transfer dies onto an offbearing conveyor 164, suitably arranged to receive the articles.

Before this transfer is effectuated, however, the articles are pressed and calendered in zone D, making use of the surfaces of the transfer dies as the press platens and calendering surfaces.

This is made possible by supplementing the action of cam 152 with lever means 166 pivoted to a cylinder 168 and so arranged as to bear down on the margins of each die holder as it passes the cylinder. A substantial but controlled pressure thus is applied to the transfer dies as required to consolidate articles 72 in the forming dies and to render their surfaces smooth and uniform.

In the illustrated form of the invention, the lever means comprise a pair of lever assemblies of substantially identical construction, FIGS. 9 and 10.

A plate 180 having a central, vertical slot 182 is bolted between two of the frame members of the apparatus. It mounts a bracket 184 which in turn supports a pivot pin 186.

Fulcrumed to pivot pin 186 intermediate its ends is lever arm 166. On the outer end of the lever arm is a pressure-applying roller 188. On the other end are a plurality of spaced openings 190 to a selected one of which is connected the motor means employed for reciprocating the lever in angular movement between its full line retracted position and its dotted line pressing position of FIG. 9.

Although various types of motors may be used for the indicated purpose, it is preferred to employ a fluid operated cylinder 168, the piston rod of which is connected to the outer end of lever arm 166 by means of pin 194. The base of the cylinder is mounted on a bracket 196.

Cylinder 168 is double acting, its action being controlled by a valve 198 which includes a spring pressed plunger 200.

Means are provided for operating plunger 200 of the valve, and hence cylinder 168, as each of the nesting die pairs passes the press station. To this end, there is provided a cam 202 extending parallel to the path of travel of the dies, spaced outwardly a short distance therefrom. The cam is fastened to and supported by one end of a bell crank lever 204. The other end of this lever bears against spring pressed plunger 200 of the cylinder control valve.

Extending outwardly from the side margin of each transfer die plate 170 is a cam follower, roller 206. This is positioned to track on the surface of cam 202, operating valve 198, and actuating cylinder 168 and its companion cylinder on the other side of the apparatus, to which it is connected.

The cylinders then operate lever arms 166 to which they are connected. These, in turn, moving to their dotted line positions, bear against the side margins of a selected one of the die pairs, for example, the one immediately behind the one which at the moment is energizing the cylinders.

In their advanced pressing position, the lever arms force press rollers 188 against the side margins of transfer die plate 170, or against longitudinally extending pads 208 mounted on the die plate for that purpose.

As a result, the transfer dies are pressed heavily against the articles in the forming dies, as the die pairs pass the press station. The pressure is applied uniformly across the entire areas of the dies. It also is applied continuously, without stopping the conveyors on which the dies are mounted.

As a consequence, the pulp articles in the transfer dies are consolidated to the desired degree and their outer surfaces calendered to impart to them the desired porosity and surface smoothness.

After pressing the articles in zone D and transferring them in zone E, the transfer dies, moving counterclockwise, are recycled to the processing of further articles as they move into the processing area on endless conveyor 20. The forming dies of the latter conveyor, however, relieved of the formed articles, and traveling counterclockwise also, pass through cleaning zones F and G.

In zone F they may be sprayed with steam by jet cleaning unit 180. They next may be subjected to a general washing in zone G by a water spray unit indicated generally at 200. They then are ready for another pass through vat 110 in which another layer of pulp is applied to the die surfaces.

Both the upper and lower conveyor assemblies may be driven synchronously from a common motor 230. Through a suitable gear reducing unit 232, this motor drives a first chain 234 connected to sprocket 32 of drive roll 24. Through a second chain 236 it drives at the same rate the drive sprocket of the drive roll unit 140 of the upper endless conveyor assembly.

Operation

The operation of the herein described apparatus is as follows:

Vat 110 is filled with pulp slurry of the desired type and consistency. Die assemblies 44 are passed inverted into the pulp in zone A, whereupon they pick up a coating of the predetermined thickness, forming the articles.

The dies leaving the vat pass to zone B wherein, by the continued application of vacuum, the articles are dehydrated and consolidated. This is accomplished by passing the dies around a vacuum wheel 39 having hollow spokes connected to a source of vacuum and communicating with the dies.

Next the dies pass through zone C where they again are connected to the vacuum source which now serves the function of pulling hot gas from oven 136 through the articles and through the dies, thereby drying the articles to any predetermined degree without scorching them and without case hardening them, as was the case when the prior art heated transfer dies were employed to serve the drying function.

Next the dies are transferred to zone D wherein cylinders 168, actuated by cam follower 206 and cam 202 on bell crank lever 204, apply pressure to transfer dies 150 mounted on the endless conveyor 22. This further compresses the articles and calenders their surfaces, making them smooth.

In zone E, release of suction applied to the forming dies on the lower conveyor assembly and concomitant application of vacuum to the transfer dies on the upper conveyor assembly results in passing the articles from the former to the latter. They then are blown off on conveyor 164.

The forming dies on the lower conveying unit, from which the articles have been removed, now pass through jet cleaning unit 180 and washing unit 200 in zones F and G, after which they are cycled to vat 110 for the deposit of a further quantity of pulp.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. In pulp molding apparatus including overlapping dual conveyor means having article-forming vacuum dies on one conveyor and mating vacuum transfer dies on the other, the forming and transfer dies, when mated, forming die pairs, press means for pressing the transfer dies against the articles on the forming dies, thereby consolidating and calendering them, the press means comprising:
   (a) lever means mounted at a press station for angular reciprocation between a pressing position and a rest position with reference to the die pairs as they pass the press station in succession,
   (b) motor means connected to the level means for reciprocating it between its two positions, and
   (c) motor actuating means positioned in the path of travel of the die pairs for actuating the motor means at intervals timed to the passage of the dies past the pressing station.

2. The apparatus of claim 1 wherein the lever means comprise a pair of levers fulcrumed intermediate their ends with the motor means connected to one of their ends and the other of their ends being positioned to bear against the side margins of the transfer dies when the levers are in their pressing position.

3. The apparatus of claim 1 wherein the motor means comprise fluid actuated cylinder means.

4. The apparatus of claim 1 wherein the motor actuating means comprise cam means positioned adjacent the path of travel of the transfer dies, cam follower means mounted on the die pairs and positioned to actuate the cam means, and motor energizing means positioned for actuation by the cam means upon engagement of the cam means by the cam follower means.

5. In pulp molding apparatus including overlapping dual conveyor means having article-forming vacuum dies on one conveyor and mating vacuum transfer dies on the other, the forming and transfer dies, when mated, forming die pairs, press means for pressing the transfer dies against the articles on the forming dies, thereby consolidating and calendering them, the press means comprising:
   (a) a pair of levers fulcrumed intermediate their ends on opposite sides of a press station for angular reciprocation between a pressing position and a retracted position with reference to the transfer dies as they pass the press station in succession, the inner ends of the levers being positioned to bear against the side margins of the transfer dies when they are in their pressing position,
   (b) a pair of fluid actuated cylinders, one connected to the outer end of each of the levers,
   (c) cam follower means on each of the die pairs,
   (d) cam means extending parallel to the die pairs parallel thereto and positioned for engagement by the cam follower means, and
   (e) valve means connected to the fluid operated cylinders and positioned for actuation by the cam means.

References Cited by the Examiner
UNITED STATES PATENTS

| | | | |
|---|---|---|---|
| 1,989,048 | 1/35 | Winter et al. | 100—154 |
| 2,071,999 | 2/37 | Dike | 100—154 |
| 2,281,860 | 5/42 | Renault | 100—154 |
| 2,609,733 | 9/52 | Honnig | 162—225 |

FOREIGN PATENTS 200,577  2/39  Switzerland.

DONALL H. SYLVESTER, *Primary Examiner.*